United States Patent [19]

Herbst et al.

[11] 3,854,856
[45] Dec. 17, 1974

[54] INJECTION MOLDING MACHINE WITH ACCESSIBLE EJECTOR ASSEMBLY

[75] Inventors: Richard Herbst, Munich; Erwin Meingast, Treuchtlingen; Ernst Wüerl, Weissenburg, all of Germany

[73] Assignee: Krauss Maffei Aktiengesellschaft, Munich, Germany

[22] Filed: Aug. 15, 1972

[21] Appl. No.: 280,901

[30] Foreign Application Priority Data
Sept. 15, 1971 Germany............................ 2146147

[52] U.S. Cl...... 425/173, 425/DIG. 222, 425/451.5, 425/444
[51] Int. Cl.............................................. B29f 1/14
[58] Field of Search .. 425/173, 444, 450, DIG. 222; 249/67, 68

[56] References Cited
UNITED STATES PATENTS

| | | | |
|---|---|---|---|
| 2,483,093 | 9/1949 | Harvey............................ | 249/68 |
| 2,485,336 | 10/1949 | Valyi................................ | 425/444 |
| 3,213,490 | 10/1965 | Johnson............................ | 425/444 |
| 3,334,378 | 8/1967 | Wirz et al........................ | 425/444 |
| 3,547,184 | 12/1970 | Kock et al. .................... | 425/444 X |
| 3,613,156 | 10/1971 | Jager................................ | 425/444 |
| 3,736,092 | 5/1973 | Konig et al. ............... | 425/DIG. 222 |

*Primary Examiner*—Andrew R. Juhasz
*Assistant Examiner*—David S. Safran
*Attorney, Agent, or Firm*—Michael S. Striker

[57] ABSTRACT

An injection molding machine wherein the rear side of the movable platen is provided with a frame-like reinforcing structure defining a compartment and two windows which latter afford access to coupling means between the knockout pins and the actuating means of the ejector assembly. The coupling means consists of one or two crossheads one of which extends into and beyond the windows and is movable therein when the actuating means is operated to move the knockout pins forwardly and to thus expel a freshly formed article from the mold cavity which is located between the movable platen and a stationary platen. The links of the toggle mechanism which moves the movable platen to and from its closed position are attached to reinforcing projections provided at the rear side of the movable platen and positioned to define two passages each of which registers with one of the windows.

6 Claims, 3 Drawing Figures

PATENTED DEC 17 1974

INJECTION MOLDING MACHINE WITH ACCESSIBLE EJECTOR ASSEMBLY

BACKGROUND OF THE INVENTION

The present invention relates to injection molding machines in general, and more particularly to improvements in injection molding machines of the type wherein a movable platen is shiftable toward and away from a stationary platen to thereby close or open a mold having sections which are respectively secured to those sides of the two platens which face each other. Still more particularly, the invention relates to improvements in ejector assemblies for injection molding machines of the above-outlined character.

It is already known to provide an injection molding machine with an ejector assembly having a hydraulic cylinder which is located at the rear or outer side of the movable platen and which may but need not share the movements of such platen toward and away from the stationary platen. The movable platen has a centrally located opening through which the piston rod of the ejector cylinder extends and carries at its front end a plate for one or more ejecting elements which preferably assume the shape of knockout pins. A drawback of such ejector assemblies is that their components are not readily accessible when the injection molding machine is fully assembled. Therefore, an inspection, repair and/or replacement of one or more component parts of the ejector assembly necessitates an at least partial dismantling of the injection molding machine. Thus, at least partial dismantling of the machine will be necessary when the operator desires to disconnect one or more knockout pins from the supporting plate which is secured to the piston rod of the ejector cylinder. The problem is further aggravated when the movable platen is reciprocable by a customary toggle mechanism which has several pairs of links articulately connected to the rear side of the movable platen. As a rule, the elements of the toggle mechanism must be removed if an attendant desires to reach the component parts of the ejector assembly.

SUMMARY OF THE INVENTION

An object of the invention is to provide an injection molding machine wherein the assembly which serves to eject freshly molded articles from one or more mold cavities between a stationary platen and a movable platen is readily accessible without necessitating even partial dismantling of the machine.

Another object of the invention is to provide an injection molding machine with novel and improved means which serves to shift the movable platen and is constructed and assembled in such a way that it does not interfere with access to component parts of the ejector assembly.

A further object of the invention is to provide a novel and improved platen for use in an injection molding machine of the above-outlined character.

Still another object of the invention is to provide an ejector assembly wherein the knockout pin or pins can be reached by an operator with conventional tools and in a fully assembled condition of the machine.

A further object of the invention is to provide a readily accessible coupling between the actuating and ejecting elements of an ejector assembly in an injection molding machine.

The invention is embodied in an injection molding machine which comprises a first platen, a second platen which is movable toward and away from the first platen, the platens having first sides which face each other and second sides which face away from each and one of the two platens having at its second side reinforcing means defining a compartment and at least one lateral window or opening communicating with an affording access to the compartment, and ejector means including at least one knockout element which is movably installed in the one platen and/or in the mold section which is mounted on the one platen, actuating means which is operable to move the knockout element relative to the one platen, and coupling means which connects the knock-out element with the actuating means. In accordance with a feature of the invention, the coupling means is located in the compartment and is accessible by way of the window or windows defined by the reinforcing means.

The reinforcing means preferably constitutes a polygonal or ring-shaped frame which at least substantially surrounds the compartment. The one platen is preferably the movable platen and the second side of this movable platen is preferably further provided with reinforcing projections each of which is located at a different corner of the movable platen and which are articulately connected with the links of a toggle mechanism serving to move the movable platen toward or away from the first platen. The projections at the second side of the movable platen are disposed in such a way that they define two passages each of which registers with and is outwardly adjacent to a different window of the reinforcing means. The coupling means may comprise a crosshead having portions which extend into the windows and are movable in the respective windows with sufficient clearance to allow the actuating means to move the knockout element or elements through strokes of desired length.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
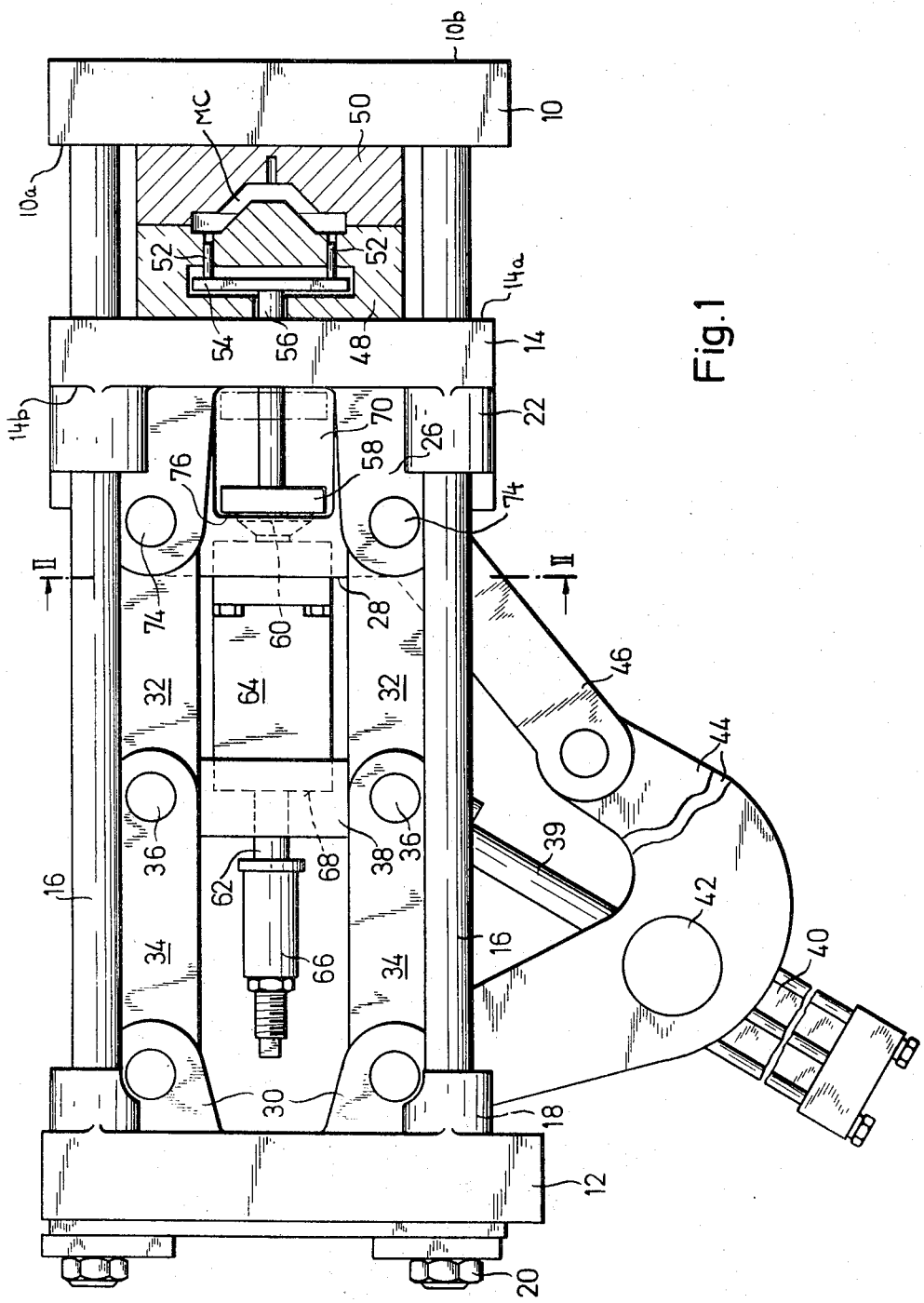
FIG. 1 is a fragmentary side elevational view of an injection molding machine which embodies the invention.
Figure 2:
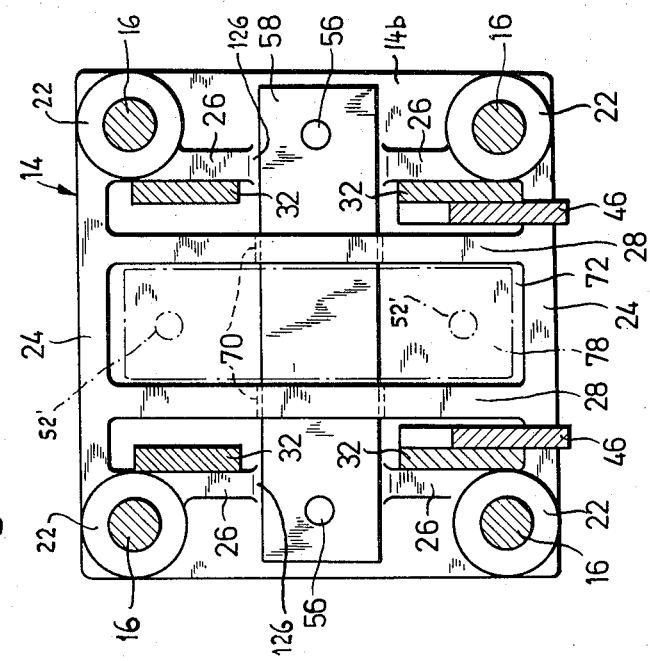
FIG. 2 is a transverse vertical sectional view as seen in the direction of arrows from the line II—II of FIG. 1.

Referring first to FIGS. 1 and 2, there is shown an injection molding machine which comprises a stationary thrust plate 12, a first platen 10 which is assumed to be stationary, and a movable second platen 14 which is disposed between the platen 10 and thrust plate 12 and is guided for reciprocatory movement by four horizontal tie rods 16. The members 10, 12 and 14 are assumed to have a substantially square outline (see the outline of the movable platen 14 in FIG. 2). The end portions of the tie rods 16 are secured to stationary platen 10 and to thrust plate 12. As shown in FIG. 1, the right-hand end portions of the tie rods 16 are rigid with the platen 10, and left-hand end portions of the tie rods 16 are provided with external threads to take adjusting nuts 20. The four corner portions of the thrust plate 12 are formed with sleeves 18 surrounding the adjacent portions of the tie rods 16.

The platens 10 and 14 have first sides or surfaces 10a and 14a which face each other and second sides or surfaces 10b, 14b which face away from each other. The stationary platen 10 supports a first mold section 50 and the movable platen 14 supports a second mold section 48. When the mold including the sections 48 and 50 is closed as shown in FIG. 1, the mold sections define at least one mold cavity MC into which an injection mechanism introduces plasticized synthetic plastic material which is thereupon allowed or caused to set and to form a shaped article. The mold sections 48 and 50 respectively extend forwardly from the first sides 14a and 10a of the platens 14 and 10. The movable platen 14 is further provided with four parallel sleeves 22 each of which is adjacent to the side 14b and each of which is located in a different corner portion of the platen 14. The sleeves 22 surround the adjacent portions of the respective tie rods 16. The movable platen 14 is further provided with novel reinforcing means which includes two parallel horizontal reinforcing ribs 24. The upper rib 24 extends between the two upper sleeves 22, and the lower rib 24 extends between the two lower sleeves 22 of the movable platen 14. The reinforcing means further comprises two vertical connecting ribs 28 which extend between the upper and lower reinforcing ribs 24 to form therewith a substantially frame-like structure of rectangular outline. It will be noted that the vertical connecting ribs 28 are inwardly adjacent to the respective left-hand and right-hand tie rods 16 and sleeves 22, as viewed in FIG. 2. In other words, the width of the relatively narrow vertical compartment 72 defined by the ribs 24 and 28 of the reinforcing means at the rear or second side 14b of the movable platen 14 is only a small fraction of its height. The rear or second side 14b of the movable platen 14 is further provided with two pairs of vertically aligned reinforcing projections 26. As shown in FIG. 2, the two left-hand projections 26 define a first passage 126 which outwardly adjacent to and registers with a first window 70 provided in the left-hand vertical connecting rib 28. The right-hand reinforcing projections 26 define a second passage 126 which is outwardly adjacent to and registers with a second window 70 defined by the right-hand connecting rib 28 of the platen 14.

The right-hand side of the thrust plate 12, as viewed in FIG. 1, is provided with four projections or lugs 30 each of which is located in a vertical plane and each of which faces one of the reinforcing projections 26 on the movable platen 14. Each of the lugs 30 is adjacent to and may be made integral with one of the sleeves 18 on the thrust plate 12. The toggle mechanism which serves to move the platen 14 toward and away from the platen 10 includes a first set of four links 34 which are articulately connected to the lugs 30 of the thrust plate 12, a second set of four links 32 each of which is articulately connected with one of the reinforcing projections 26, a vertical connecting link 38 which extends between the overlapping portions of the links 32 and 34, and two horizontal pivot pins 36 one of which connects the upper end of the link 38 with the upper links 32, 34 and the other of which connects the lower end of the link 38 with the lower links 32, 34. The means for pivoting the links 32, 34 relative to each other comprises a hydraulic clamping cylinder 40 having a piston rod or ram 39 which is connected to the lower pivot pin 36. The body of the hydraulic clamping cylinder 40 is turnable on a pivot pin 42 which traverses two bell crank levers 44 articulately connected to the lower projections or lugs 30 or the thrust plate 12. The bell crank levers 44 are further articulately connected with links 46 which are pivotable about the common pivot axis of the lower links 32. The exact details of the toggle mechanism, save for the mode of attaching the links 32 to the reinforcing projections 26 of the movable platen 14 form no part of the present invention. The pivot pins which connect the links 32 with the projections 26 are shown at 74.

The ejector assembly of the injection molding machine shown in FIGS. 1 and 2 comprises several (for example, four) ejecting elements 52 in the form of knockout pins which are reciprocably installed in bores provided therefor in the mold section 48 at the first side 14a of the movable platen 14. The rear end portions of the knockout pins 52 are secured to a plate-like holder 54 which is reciprocable in an enlarged recess of the mold section 48. The holder 54 is connected with the forward ends of two ejecting shafts or rods 56 which extend through the movable platen 14 and into the aforementioned compartment 72 which is surrounded by the reinforcing ribs 24 and 28 at the rear side 14b of the platen 14. The rear end portions of the ejecting shafts 56 are secured to a crosshead 58 which has portions extending laterally through and beyond the windows 70 of the vertical connecting ribs 28 (see FIG. 2). It will be noted that the ejecting shafts 56 are attached to the crosshead 58 at points which are outwardly adjacent to the passages 126 defined by the respective pairs of vertically aligned reinforcing projections 26 on the platen 14. The crosshead 58 is threadedly connected with a head 60 forming part of actuating means for the knockout pins 52. The actuating means further comprises an ejector cylinder 64 which is mounted on the movable platen 14 and has a piston rod 62. The forward end of the piston rod 62 is connected with the head 60 and the rear end of the piston rod 62 carries an internally threaded sleeve 66 which serves as an adjustable abutment for determining the extent of forward movement of the crosshead 58 when the piston rod 62 is caused to leave the retracted position shown in FIG. 1 and to move forwardly toward its extended position in which its right-hand flange abuts against the rear end face 68 of the ejector cylinder 64. The ejector cylinder 64 is preferably located in the center of the space between the four tie rods 16.

As shown in FIG. 2, the crosshead 58 extends at right angles to the vertical connecting ribs 28 of the reinforcing structure at the rear side 14b of the movable platen 14. The central portion of the compartment 72 between the ribs 24 and 28 is located in front of the ejector cylinder 64 so that the head 60 at the forward end of the piston rod 62 is not readily accessible from the rear side of the compartment 72. However, the head 60 can be readily reached by a suitable tool which may be introduced through the one or the other of the windows 70 in the vertical connecting ribs 28. The length of the windows 70, as considered in the direction of movement of the platen 14, is not only sufficient to allow the piston rod 62 to perform strokes of required length but the windows are long enough to insure that an operator can gain access to the head 60 and crosshead 58, for example, to detach the crosshead 58 from the shafts 56 and/or to detach the crosshead 60 from the crosshead 58. As mentioned before, the head 60 is preferably threadedly connected with the crosshead 58. The same applies for the connection between the crosshead 58 and the shafts 56. The parts 56, 58 and 60 constitute a simple coupling device which connects the knockout pins 52 with the actuating means (cylinder 64 and piston rod 62) of the ejector assembly. Since the reinforcing projections 26 define the aforementioned passages 126 which register with the adjacent windows 70 of the vertical connecting ribs 28, the projections 26 cannot interfere with access to the compartment 72 so that the operator can readily reach the coupling means 56, 58, 60. The width of the reinforcing projections 26, as considered in the direction of movement of the platen 14, preferably equals the corresponding dimmensions of the vertical connecting ribs 28. It will be noted (see FIG. 1) that the width of the reinforcing projections 26 (as considered in a direction toward the thrust plate 12) exceeds considerably the thickness of the movable platen 14. Therefore, and since the aforementioned pivot pins 74 for the links 32 are located in the region of (or to the left of) the rearmost portions 76 of the windows 70 (see FIG. 1), the links 32 cannot interfere with access to the windows 70 irrespective of their angular positions relative to the tie rod 16. As shown in FIG. 1, the axes of the pivot pins 74 are located to the left of the rearmost portion 76 of the illustrated window 70 so that, even if the links 32 are pivoted through full 90°, they cannot obstruct access to the respective windows 70. In other words, when the piston rod 39 is retracted by moving downwardly, as viewed in FIG. 1, so that the links 32 pivot in a counterclockwise direction, as viewed in FIG. 1, the upper links 32 cannot reach the rearmost portion 76 the adjacent window 70 so that the entire window 70 remains unobstructed in each angular position of the links 32.

If desired, the coupling means between the ejecting elements 52 and the actuating means of the ejector assembly may include a second crosshead 78 which is indicated in FIG. 2 by phantom line. The crosshead 78 extends at right angles to the horizontal crosshead 58 and is fully received in the compartment 72 between the horizontal reinforcing ribs 24 and vertical connecting ribs 28. For example, the coupling means will include two crossheads (58 and 78) if the ejector assembly comprises four knocknout pins 52 whereby two of the knockout pins can be mounted on the crosshead 58 and the remaining two knockout pins (see the phantom-line pins 52' of FIG. 2) are then mounted on the vertical crosshead 78. Since the crosshead 78 does not extend through the windows 70 of the vertical ribs 28, it is completely accommodated in the compartment 72 and can be reached only by way of the windows 70. On the other hand, and as clearly shown in FIG. 2, the end portions of the horizontal crosshead 58 extends through and well beyond the respective windows 70 and also through and beyond the respective passages 126. It is also within the scope of the invention to make the crosshead 78 integral with or separably connectable to the crosshead 58 as well as to omit the crosshead 58 and to employ a coupling means which includes only the crosshead 78, shafts 56 and head 60. If the crosshead 78 is used alone, it is directly connected with the head 60. It is further clear that the head 60 can be omitted altogether, and that the front end portion of the piston rod 62 can be threadedly or otherwise connected directly with the crosshead 58 and/or 78.

Figure 3:
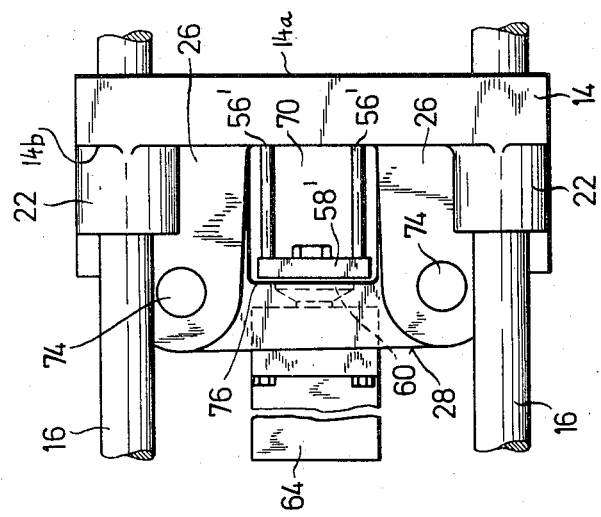
FIG. 3 is a fragmentary side elevational view of a slightly modified injection molding machine.

The coupling means of the ejector assembly shown in FIG. 3 comprises a horizontal crosshead 58' which is directly connected with knockout pins 56' so that the knockout pins are accessible by way of the windows or openings 70 in the reinforcing structure at the rear or second side 14b of the movable platen 14. Otherwise, the construction of the injection molding machine shown in FIG. 3 is identical with that of the machine shown in FIGS. 1 and 2. The knockout pins 56' of FIG. 3 are long enough to extend through the entire movable platen 14 and into the corresponding mold section 48 (not shown in FIG. 3) so that they can expel a freshly shaped article from the mold cavity between the two mold sections as soon as the mold is opened in response to leftward movement of the movable platen 14.

If desired, the reinforcing structure 24, 28 at the second side 14b of the platen 14 can be configurated in such a way that it forms a substantially circumferentially complete ring extending around the compartment 72. It is also within the scope of the invention to mount the ejector assembly behind the stationary platen 10 of FIG. 1. An advantage of such ejector assembly is that the actuating cylinder 64 need not move back and forth. The reinforcing structure is then provided at the second side 10b of the platen 10.

An improtant advantage of the improved injection molding machine is that at least some elements which forms the ejector assembly are accessible without necessitating even partial dismantling of the injection molding machine. This can be readily appreciated by looking at FIGS. 1 and 3 each of which shows that the coupling means between the knockout pins and the actuating means of the respective ejector assembly can be reached by way of the windows 70. Though it is preferred at this time to provide the reinforcing structure with two windows 70, it is equally possible to employ a single window, for example, at that side of the injection molding machine which is more readily accessible to an attendant. The height or width of the reinforcing means, as considered in the longitudinal direction of the tie rods 16, is preferably such that the windows 70 are located in a neutral zone insofar as the bending stresses upon the movable platen 14 are concerned. By utilizing such relatively wide reinforcing means, the stiffness of the movable platen 14 is sufficient to prevent any buckling or other deformation during injection of plasticized material in spite of the provision of one or two windows 70 in the reinforcing means. It was found that the expenditures for material in the manufacture of the improved movable platen 14 are not higher or not substantially higher than those involved in the manufacture of conventional movable platens which do not have windows affording access to the component parts of the ejector assembly. As a rule, the length of each window 70, as considered in the longitudinal direction of the tie rods 16, should at least equal the maximum length of strokes to be performed by the piston rod 62 plus the thickness of those portions of the crosshead 58 or 58' which extend through the respective windows.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an injection molding machine, a combination comprising a first platen; a second platen movable toward and away from said first platen, said platens having first sides facing each other and second sides facing away from each other and one of said platens having at said second side thereof reinforcing means defining a compartment and two lateral windows located opposite each other, communicating with and affording access to said compartment; and ejector means including at least one knockout element movable relative to said one platen, and coupling means connecting said knockout element with said actuating means, said coupling means comprising a crosshead having a portion located in said compartment and further portions extending into and movable relative to said lateral windows in response to operation of said actuating means.

2. A combination as defined in claim 1, wherein said actuating means is operable to move said crosshead through strokes of predetermined length and the length of said lateral windows, as considered in the direction of movement of said crosshead, at least equals the combined length of one of said strokes and the thickness of the respective portions of said crosshead.

3. In an injection molding machine, a combination comprising a first platen; a second platen movable toward and away from said first platen, said platens having first sides facing each other and second sides facing away from each other, and each of said platens having a substantially square outline and four corner portions, said second platen having sleeves provided at the four corner portions thereof and reinforcing means comprising two substantially parallel reinforcing ribs extending between a different pair of said sleeves and two additional reinforcing means extending transversely of and between said parallel ribs, said reinforcing ribs defining a compartment and at least one lateral window communicating with and affording access to said compartment; parallel tie rods secured to said first plate and extending through said sleeves to guide said second platen during movement toward and away from said first platen; and ejector means including at least one knockout element movable relative to said second platen, actuating means operable to move said knockout element relative to said second platen, and coupling means connecting said knockout element with said actuating means, said coupling means comprising two crossheads crossing each other, one of which is located in said compartment between said additional reinforcing ribs and being accessible by way of said window.

4. A combination as defined in claim 3, wherein said reinforcing means defines two windows each provided in a different one of said additional ribs, the other of said crossheads having portions extending outwardly from said compartment through said windows and being movable in the respective windows in response to operation of said actuating means.

5. In an injection molding machine, a combination comprising a first platen; a second platen movable toward and away from said first platen and having four corner portions and a projection at each of said corner portions, said platens having first sides facing each other and second sides facing away from each other, and one of said platens having at said second side thereof reinforcing means defining a compartment and two lateral windows located opposite each other and communicating with and providing access to said compartment, said projections being outwardly adjacent to said windows and defining two passages, each of which registers with a different one of said windows; ejector means including at least one knockout element movable relative to said one platen, actuating means operable to move said knockout element relative to said one platen, and coupling means connecting said knockout element with said actuating means, at least a portion of said coupling means being located in said compartment and being accessible by way of said window; and moving means for moving said second platen relative to said first platen, said moving means comprising a toggle mechanism having links articulately connected with said projections.

6. A combination as defined in claim 5, wherein said windows are located at a predetermined level and said projections include a first pair of projections located above said level and a second pair of projections located below said level.

* * * * *